US011750140B1

United States Patent
Gajanayake et al.

(10) Patent No.: US 11,750,140 B1
(45) Date of Patent: Sep. 5, 2023

(54) DETECTION AND CONTROL OF MOTOR DRIVE DURING AN AC SIDE GROUND FAULT

(71) Applicants: Rolls-Royce Singapore Pte. Ltd., Singapore (SG); Rolls-Royce Corporation, Indianapolis, IN (US)

(72) Inventors: Chandana Jayampathi Gajanayake, Singapore (SG); Shuai Wang, Singapore (SG); David Russell Trawick, Indianapolis, IN (US)

(73) Assignees: Rolls-Royce Singapore Pte. Ltd., Singapore (SG); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/661,242

(22) Filed: Apr. 28, 2022

(51) Int. Cl.
*H02P 29/024* (2016.01)

(52) U.S. Cl.
CPC .................................. *H02P 29/024* (2013.01)

(58) Field of Classification Search
CPC ...................................................... H02P 29/024
USPC .................................................. 318/141, 140
See application file for complete search history.

(56) References Cited

U.S. PATENT DOCUMENTS

| | | | | |
|---|---|---|---|---|
| 7,279,861 B2* | 10/2007 | Takahashi | ............ | H02H 7/1216 318/473 |
| 7,292,042 B2 | 11/2007 | Morita et al. | | |
| 7,876,581 B2* | 1/2011 | Kim | ........................ | H01F 27/42 363/16 |
| 9,274,158 B2 | 3/2016 | Tang et al. | | |
| 9,612,269 B2* | 4/2017 | Wei | ........................ | G01R 31/52 |
| 9,899,953 B2* | 2/2018 | Figie | ................... | H02P 29/0241 |
| 2015/0068473 A1 | 6/2015 | Fornage et al. | | |

OTHER PUBLICATIONS

Admin "Ground Fault Nuisance Tripping in VFD Applications," KEB, News, Technical Papers, Jan. 7, 2020, 17 pp. Retrieved from the Internet: https://www.kebamerica.com/blog/ground-fault-nuisance-tripping-in-vfd-applications/.

* cited by examiner

*Primary Examiner* — David Luo
(74) *Attorney, Agent, or Firm* — Shumaker & Sieffert, P.A.

(57) ABSTRACT

An example system includes an electric machine, an alternating current (AC)/direct current (DC) converter, a Y-capacitor, and a controller. The AC/DC converter being connected to the electric machine and having a DC side and an AC side. The Y-capacitor is located on the DC side of the AC/DC converter. The controller is configured to determine, based on a measurement of the DC side of the AC/DC converter, an occurrence of a ground fault on the AC side of the AC/DC converter, and control, based on the occurrence of the ground fault, operation of the AC/DC converter.

20 Claims, 9 Drawing Sheets

DETECTION AND CONTROL OF MOTOR DRIVE DURING AN AC SIDE GROUND FAULT

TECHNICAL FIELD

This disclosure relates to electrical power systems.

BACKGROUND

An electrical power system may include one or more electrical machines, one or more controllers, and one or more loads separated from the one or more electrical machines by one or more power converters. In a bidirectional electrical power system, a power converter may allow power to flow in either direction between the electrical machine and the load. The one or more power converters may include a plurality of switches and an electromagnetic interference (EMI) filter.

SUMMARY

This disclosure describes techniques for determining an occurrence of an alternating current (AC) side ground fault in an electrical power system that includes an electric machine, an AC/direct current (DC) power converter and a controller. The AC/DC converter may also be a DC/AC converter, but for simplicity the converter will be referred to as an AC/DC converter throughout. The controller may be configured to receive signals indicating a measurement on the DC-side of the AC/DC converter and determine an occurrence of a ground fault on the AC-side of the AC/DC converter based on the measurement. The controller may also be configured to control operation of the AC/DC power converter based on the received signals indicating the measurement.

The techniques of this disclosure may allow for faster, easier, and more accurate detection of an AC-side fault, as compared to existing techniques that monitor the phase current of the electric machine. A controller implementing the techniques of this disclosure may be able to determine and control whether the AC/DC power converter continues operation or whether the AD/DC power converter is to be shut down. The techniques of this disclosure may also allow for an electrical power system to continue to operate safely when the internal components are able to withstand voltage, current, and/or temperature increases due to an AC-side ground fault.

In some examples, this disclosure describes a system that includes an electric machine, an AC/DC converter connected to the electric machine, the AC/DC converter having a DC side and an AC side, a Y-capacitor on the DC side of the AC/DC converter, and a controller. The controller may be configured to determine, based on a measurement of the DC side of the AC/DC converter, an occurrence of a ground fault on the AC side of the AC/DC converter, and control, based on the occurrence of the ground fault, operation of the AC/DC converter. The measurement may be of the Y-capacitor.

In some examples, this disclosure describes a method for detecting a fault in an AC/DC converter connected to an electric machine and a controller, the AC/DC converter having a DC side, an AC side, and a Y-capacitor on the DC side. The method includes receiving, at the controller, a signal indicating a measurement of the DC side of the AC/DC converter, determining, by processing circuitry of the controller, that a ground fault on the AC side of the AC/DC converter occurred based on the received signal, and controlling, by the controller, operation of the AC/DC converter in response to determining that the ground fault on the AC side of the AC/DC converter occurred. The measurement is of the Y-capacitor.

In some examples, a device comprising a computer-readable storage medium having executable instructions stored thereon, configured to be executable by processing circuitry of the device for causing the processing circuitry to receive a signal indicating a measurement of a direct current (DC) side of an alternating current (AC)/DC converter, determine that a ground fault on an AC side of the AC/DC converter occurred based on the received signal, and control operation of the AC/DC converter in response to determining that the ground fault on the AC side of the AC/DC converter occurred. The measurement may indicate at least one of a voltage across a Y-capacitor on the DC side and a current in the Y-capacitor. The instructions are configured to be executable by the processing circuitry for further causing the processing circuitry to determine the measured voltage across a Y-capacitor is greater than a voltage threshold level or the current in the Y-capacitor is greater than a current threshold level, and determine the ground fault on the AC side of the AC/DC converter occurred in response to determining the measured voltage across a Y-capacitor is greater than the voltage threshold level or determining the current in the Y-capacitor is greater than the current threshold level.

The details of one or more examples are set forth in the accompanying drawings and the description below. Other features, objects, and advantages will be apparent from the description and drawings, and from the claims.

DETAILED DESCRIPTION

An electrical power system may include one or more electrical machines, one or more controllers, and one or more loads electrically separated from the one or more electrical machines by one or more power converters. The power converters may drive the electrical machine, such as a motor or a generator. A ground fault is a common fault that may occur in machine winding, connecting cable, or on an AC side of a power converter. A ground fault may occur from insulation breakdown in the machine winding or cables. When an electrical machine has a ground fault, it may be necessary to disconnect and isolate the detected ground fault to prevent further damage to a power converter or other systems in the electrical power system.

Monitoring the phase current of an electrical machine to detect a ground fault may be unreliable and may require very high bandwidth sensors that make it difficult to implement practically. In addition, if the ground fault is a single ground fault that does not damage the internal components of the electrical system, then an electrical power system may be able to continue to operate with the single ground fault. In some examples, power converters may be an AC/DC converter, or a DC/AC converter based on a machine the power converter is connected to. In this disclosure, an AC/DC converter may also refer to a DC/AC converter, but for simplicity will be referred to as an AC/DC converter.

Figure 1:
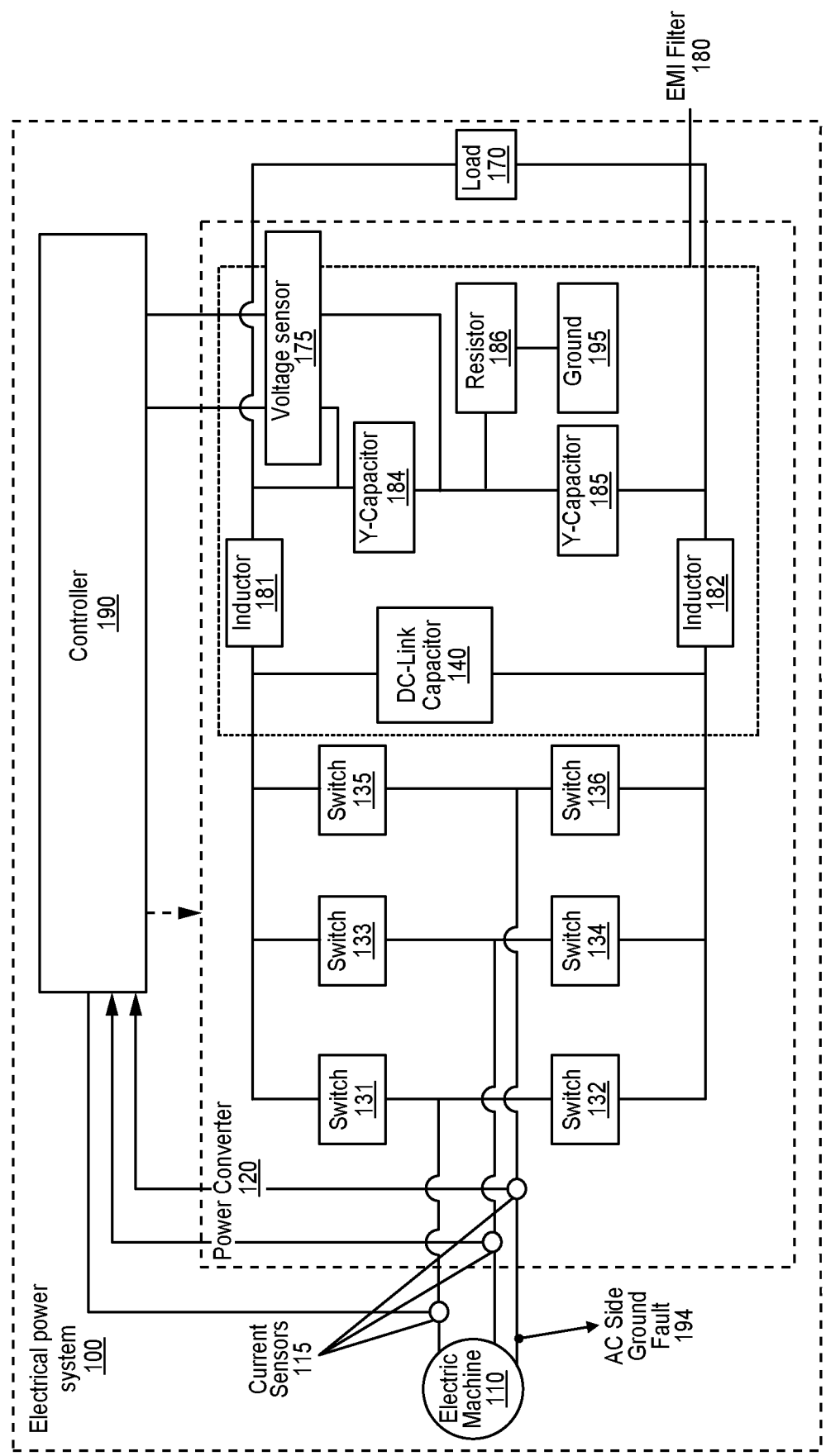
FIGS. 1-5 are conceptual block diagrams illustrating electrical power systems including an electrical machine, a power converter and a controller, in accordance with one or more techniques of this disclosure.

FIG. 1 is a conceptual block diagram illustrating electrical power system 100 including power converter 120 and controller 190 for determining an occurrence of an AC side ground fault 194 in electrical power system 100, in accordance with one or more techniques of this disclosure. Controller 190 may be configured to activate and deactivate switches 131-136 based on electrical signals received by controller 190 from current sensors 115. Current sensors 115 may be inside and/or outside of power converter 120.

Electrical power system 100 may be configured to deliver electrical power generated by electric machine 110 to load 170 via power converter 120. Power converter 120 is depicted as including six switches 131-136, although other numbers and arrangements of switches are possible for power converter 120. Switches 131-136 may include insulated-gate bipolar transistors (IGBTs), metal-oxide-semiconductor field-effect transistors (FETs), junction FETs, and/or any other transistor devices. Switches 131-136 may also be power electronic switches (e.g., either IGBTs with accompanying reverse diode, or FETs). Switches 131-136 may include materials such as GaN and/or SiC and may include antiparallel diodes in some examples.

FIG. 1 shows just one example of electrical power system 100, and many other examples of electrical power systems may use the techniques described herein. In an example, electrical power system 100 may include a mixed AC/DC system. In some examples, electrical power system 100 may include micro-grid, an AC/AC system, a DC/DC system, an AC bus, a DC bus, and/or any other type of electrical system. Electrical power system 100 may also be part of a power generation system such as a power plant, a power distribution system, and/or a residential or commercial power system, which may include energy storage and electrical loads. Electrical power system 100 may be a part of an aerospace, marine, or automotive system. The techniques of this disclosure may be especially useful in electrical vehicles, such as for the battery disconnect systems in electrical vehicles. Electrical power system 100 may be part of a vehicle such as any manned or unmanned: air vehicle, land vehicle, marine vehicle, space vehicle, and the like, which may include an engine, a generator, an alternator, and/or a power distribution system.

Electric machine 110 may be configured to generate electrical power. As an example, electric machine 110 may be a motor or generator. Electric machine 110 may include an electric generator that converts mechanical power derived from a shaft, rotor, and/or other mechanical component to electrical power for use by other components or circuits of electrical power system 100. In some examples, electric machine 110 may be an electrical motor that converts the electrical energy into rotational mechanical energy to drive a propulsor (e.g., fan, propeller, etc.) of a vehicle such as an aircraft. In some examples, the electric generator may also be mounted to a mechanical distribution system and/or a mechanical transmission system (for clarity in the drawings, neither of which is shown). In some examples, electrical power system 100 may include one or more additional power sources, although not shown in FIG. 1. Electric machine 110 may include an AC generator such as an induction generator or a DC generator that produces DC electricity. Electric machine 110 may include a wound field machine, a Halbach array generator with permanent magnets on a rotor that is driven by an engine shaft or a propulsor shaft, or any other type of generator.

Electric machine 110 may, in some examples, generate AC electricity (e.g., multi-phase AC electricity), and electrical power system 100 may include power converter 120 to generate DC electricity based on the power generated by electric machine 110. Power converter 120 may be a rectifier circuit that converts AC electricity to DC electricity.

As an example, power converter 120 may be an AC/DC converter connected to the electric machine 110, the AC/DC converter having a DC side and an AC side. The AC side may be on electric machine 110 side of power converter 120. The DC side may be on load 170 side of power converter 120.

Power converter 120 is connected between electric machine 110 and load 170. Power converter 120 may include two machine-side switches 131 and 132, two load-side switches 135 and 136, and two additional switches 133 and 134 between machine-side switches 131, 132 and load-side switches 135, 136. Power converter 120 may further include an electromagnetic interference (EMI) filter 180.

Load 170 is to receive power form electric machine 110. In some examples, load 170 may include a power converter configured to convert the power received from electric machine 110 to another form of electricity for an electrical load (not shown in FIG. 1). The power converter may produce electrical power in a form that is usable by an electrical load. In some examples, load 170 may include an engine, a generator, an alternator, and/or a power distribution system Controller 190 may be configured to control the operation of power converter 120 and any of the sensors in electrical power system 100, such as current sensors 115 and/or voltage sensor 175. Additionally or alternatively, controller 190 may be configured to control the operation of electric machine 110 and/or load 170. Controller 190 may be able to activate or deactivate electric machine 110 or otherwise control a mode of operation of electric machine 110 to deliver different levels and/or types of power. Controller 190 may also be configured to control a mode of operation of power converter 120 to deliver power to load 170.

Although not shown in FIG. 1, controller 190 may include processing circuitry, which can include any suitable arrangement of hardware, software, firmware, or any combination thereof, to perform the techniques attributed to controller 190 herein. Examples of processing circuitry include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When processing circuitry includes software or firmware, processing circuitry further includes any hardware for storing and executing the software or firmware, such as one or more processors or processing units. In examples in which electrical power system 100 are mounted on a vehicle, controller 190 may be implemented by a FADEC unit.

In general, a processing unit may include one or more microprocessors, DSPs, ASICs, FPGAs, or any other equivalent integrated or discrete logic circuitry, as well as any combinations of such components. Although not shown in FIG. 1, controller 190 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 190 (e.g., may be external to a package in which controller 190 is housed). Processing circuitry may be configured to determine whether a signal is greater than or less than a threshold level. For example, processing circuitry may include circuitry (e.g., digital or analog) and/or instructions for performing thresholding operations.

Controller 190 may deliver control signals to a control terminal of each of switches 131-136 to activate or deactivate each of switches 131-136. Controller 190 may be configured to control power converter 120 based on signals received from sensors to achieve a voltage target or to implement a startup routine or a shutdown routine.

As shown in FIG. 1, EMI filter 180 may be placed between switches 131-136 and load 170. As an example, as shown in FIG. 1, EMI filter 180 may include DC-link capacitor 140, two Y-capacitors 184, 185, two inductors 181, 182, and resistor 186. Inductors 181, 182, may affect the conduction of electricity along the electrical lines. FIG. 1 shows just one example of EMI filter 180, and many other examples of EMI filters may use the techniques described herein.

In some examples, AC side ground fault 194 may occur in winding of electrical machine 110, connecting cable, or on an AC side of power converter 120. In an example, AC side ground fault 194 may occur on an electrical line between electric machine 110 and at least one of switches 131-136. An AC side ground fault 194 may occur for many potential reasons, including the breakdown of insulation on an electrical line and/or the failure of a switch or a capacitor.

As an example, when a ground fault 194 occurs on an AC-side of power converter 120, a circulation current path may be formed via the DC-side of EMI filter 180 to the fault location when switches 131-136 of power converter 120 are active. This may result in an increased flow of high frequency currents and increased voltage in EMI filter 180 components.

As an example, and as shown in FIG. 1, EMI filter 180 may include at least one voltage sensor 175 to measure the voltage of at least one of Y-capacitors 184, 185. For this example, the voltage at Y-capacitor 184 will be discussed as being measured, but the Y-capacitor voltage may also be measured at Y-capacitor 185 or at a combination of Y-capacitors 184 and 185. In normal operation, the voltage at Y-capacitor 184 will be approximately half the value of the voltage at DC-link capacitor 140. When there is a DC side grounded fault, depending on the rail grounded, the voltage at Y-capacitor 184 will approximately be either equal to the voltage at DC-link capacitor 140 or zero. However, when there is an AC-side ground fault 194, as shown in FIG. 1, the peak voltage across Y-capacitor 184 will be larger than half the voltage at the DC-link capacitor 140. A value of half the voltage at DC-link capacitor 140 may correspond to a first voltage threshold. Thus, after measuring the voltage at Y-capacitor 184 and determining that the value of the voltage at Y-capacitor 184 is greater than the first voltage threshold, controller 190 may determine an occurrence of a ground fault 194 on the AC side of power converter 120.

Controller 190 may then control operation of power converter 120 based on controller 190 determining the occurrence of a ground fault 194 on the AC side of power converter 120. In some examples, controller 190 may control power converter 120 to continue to operate or may control power converter 120 to shut down.

In some examples, power converter 120 with a single AC-side ground fault 194 may be able to continue to operate with a single ground fault as long as the internal components of power converter 120 are able to withstand the voltage resulting from the AC-side ground fault 194. When the controller 190 determines the occurrence of a ground fault on the AC side of the power converter 120, as discussed above, the controller 190 may then compare the measured voltage at Y-capacitor 184 to a second voltage threshold. The second voltage threshold is above the first voltage threshold. The second voltage threshold corresponding to a voltage level in which the internal components of power converter 120 may not be able to safely withstand. When controller 190 determines the measured voltage at Y-capacitor 184 is below the second voltage threshold, the controller 190 continues operation of the power converter 120. When controller 190 determines the measured voltage at Y-capacitor 184 is above the second voltage threshold, the controller 190 stops operation of power converter 120.

Figure 2:
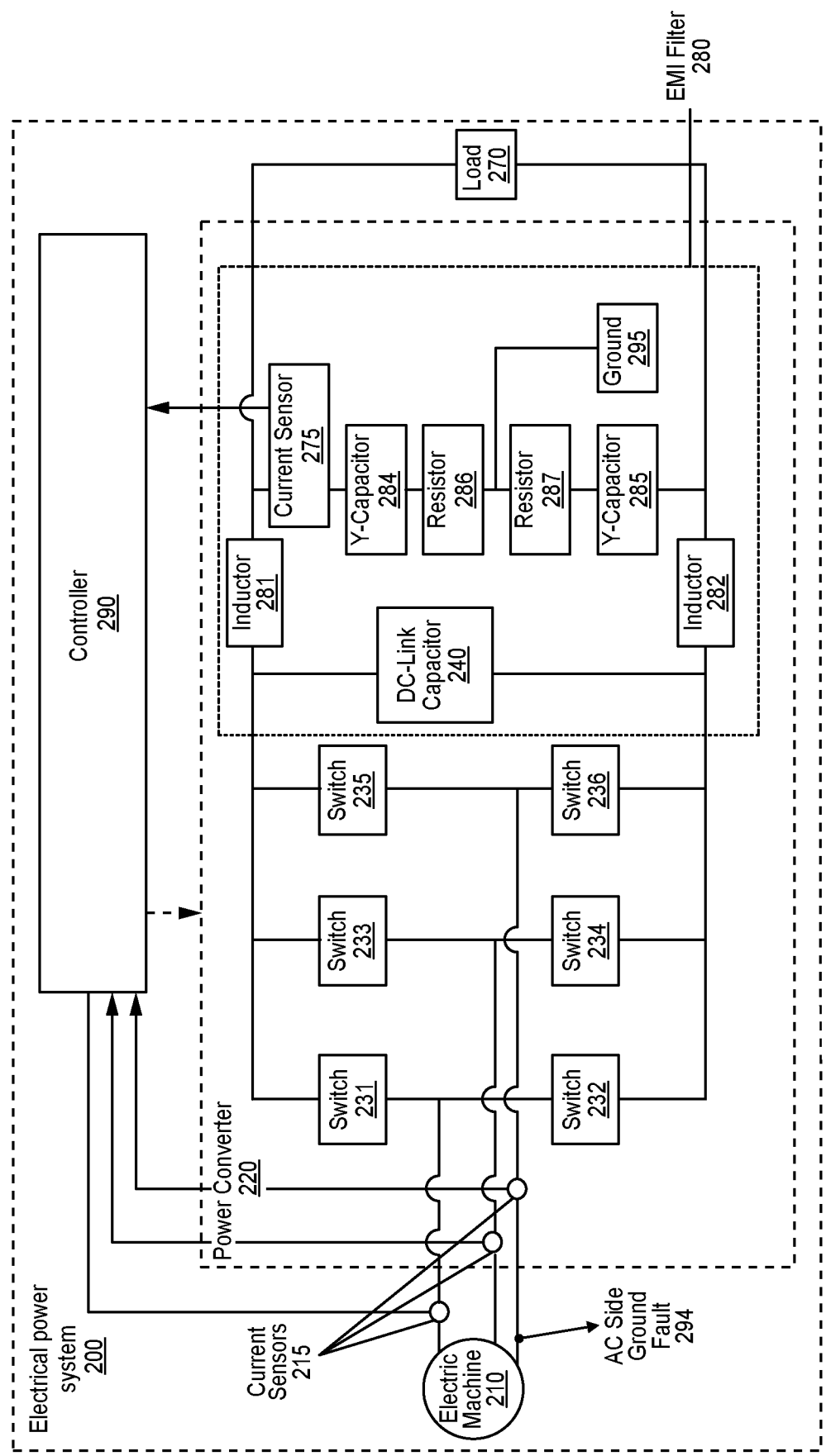

FIG. 2 is a conceptual block diagram illustrating electrical power system 200 including power converter 220 and controller 290 for determining an occurrence of an AC side ground fault 294 in electrical power system 200, in accordance with one or more techniques of this disclosure. Controller 290 may be configured to activate and deactivate switches 231-236 based on electrical signals received by controller 290 from current sensors 215. Current sensors 215 may be inside and/or outside of power converter 220.

Electrical power system 200 may be configured to deliver electrical power generated by an electric machine 210 to load 270 via the power converter 220. Power converter 220 is depicted as including six switches 231-236, although other numbers and arrangements of switches are possible for power converter 220. Switches 231-236 may include insulated-gate bipolar transistors (IGBTs), metal-oxide-semiconductor field-effect transistors (FETs), junction FETs, and/or any other transistor devices. Switches 231-236 may also be power electronic switches (e.g., either IGBTs with accompanying reverse diode, or FETs). Switches 231-236 may include materials such as GaN and/or SiC and may include antiparallel diodes in some examples.

FIG. 2 shows just one example of electrical power system 200, and many other examples of electrical power systems may use the techniques described herein.

In an example, electrical power system 200 may include a mixed AC/DC system. In some examples, electrical power system 200 may include micro-grid, an AC/AC system, a DC/DC system, an AC bus, a DC bus, and/or any other type of electrical system. Electrical power system 200 may also be part of a power generation system such as a power plant, a power distribution system, and/or a residential or commercial power system, which may include energy storage and electrical loads. Electrical power system 200 may be a part of an aerospace, marine, or automotive system. The techniques of this disclosure may be especially useful in electrical vehicles, such as for the battery disconnect systems in electrical vehicles. Electrical power system 200 may be part of a vehicle such as any manned or unmanned: air vehicle, land vehicle, marine vehicle, space vehicle, and the like, which may include an engine, a generator, an alternator, and/or a power distribution system.

Electric machine 210 may be configured to generate electrical power. As an example, the electric machine may be a motor or generator. Electric machine 210 may include an electric generator that converts mechanical power derived from a shaft, rotor, and/or other mechanical component to electrical power for use by other components or circuits of electrical power system 200. In some examples, the electric generator may also be mounted to a mechanical distribution system and/or a mechanical transmission system (for clarity in the drawings, neither of which is shown). In some examples, electrical power system 200 may include one or more additional power sources, although not shown in FIG. 2. Electric machine 210 may include an AC generator such as an induction generator or a DC generator that produces DC electricity. Electric machine 210 may include a wound field machine, a Halbach array generator with permanent magnets on a rotor that is driven by an engine shaft or a propulsor shaft, or any other type of generator.

Electric machine 210 may, in some examples, generate AC electricity (e.g., multi-phase AC electricity), and electrical power system 200 may include power converter 220 to generate DC electricity based on the power generated by electric machine 210. Power converter 220 may be a rectifier circuit that converts AC electricity to DC electricity.

As an example, power converter 220 may be an AC/DC converter connected to electric machine 210, the AC/DC converter having a DC side and an AC side. The AC side may be on electric machine 210 side of power converter 220. The DC side may be on load 270 side of power converter 220.

Power converter 220 is connected between electric machine 210 and load 270. Power converter 220 may include two machine-side switches 231 and 232, two load-side switches 235 and 236, and two additional switches 233 and 234 between machine-side switches 231, 232 and load-side switches 235, 236. Power converter 220 may further include an EMI filter 280.

Load 270 is to receive power form electric machine 210. In some examples, load 270 may include a power converter configured to convert the power received from electric machine 210 to another form of electricity for an electrical load (not shown in FIG. 2). The power converter may produce electrical power in a form that is usable by an electrical load. In some examples, the load 270 may include an engine, a generator, an alternator, and/or a power distribution system Controller 290 may be configured to control the operation of power converter 220 and any of the sensors in electrical power system 200, such as current sensors 215 and/or current sensor 275. Additionally or alternatively, controller 290 may be configured to control the operation of electric machine 210 and/or load 270. Controller 290 may be able to activate or deactivate electric machine 210 or otherwise control a mode of operation of electric machine 210 to deliver different levels and/or types of power. Controller 290 may also be configured to control a mode of operation of power converter 220 to deliver power to load 270.

Although not shown in FIG. 2, controller 290 may include processing circuitry, which can include any suitable arrangement of hardware, software, firmware, or any combination thereof, to perform the techniques attributed to controller 290 herein. Examples of processing circuitry include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When processing circuitry includes software or firmware, processing circuitry further includes any hardware for storing and executing the software or firmware, such as one or more processors or processing units. In examples in which electrical power system 200 are mounted on a vehicle, controller 290 may be implemented by a FADEC unit.

In general, a processing unit may include one or more microprocessors, DSPs, ASICs, FPGAs, or any other equivalent integrated or discrete logic circuitry, as well as any combinations of such components. Although not shown in FIG. 2, controller 290 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 290 (e.g., may be external to a package in which controller 290 is housed). Processing circuitry may be configured to determine whether a signal is greater than or less than a threshold level. For example, processing circuitry may include circuitry (e.g., digital or analog) and/or instructions for performing thresholding operations.

Controller 290 may deliver control signals to a control terminal of each of switches 231-236 to activate or deactivate each of switches 231-236. Controller 290 may be configured to control power converter 220 based on signals received from sensors to achieve a voltage target or to implement a startup routine or a shutdown routine.

As shown in FIG. 2, an EMI filter 280 may be placed between switches 231-236 and the load 270. As an example, as shown in FIG. 2, EMI filter 280 may include DC-link capacitor 240, two Y-capacitors 284, 285, two inductors 281, 282, and two resistors 286, 287. Inductors 281, 282, may affect the conduction of electricity along the electrical lines. FIG. 2 shows just one example of EMI filter 280, and many other examples of EMI filters may use the techniques described herein.

In some examples, AC side ground fault 294 may occur in winding of electrical machine 210, connecting cable, or on an AC side of power converter 220. In an example, AC side ground fault 294 may occur on an electrical line between electric machine 210 and at least one of switches 231-236. An AC side ground fault 294 may occur for many potential reasons, including the breakdown of insulation on an electrical line and/or the failure of a switch or a capacitor.

As an example, when a ground fault 294 occurs on AC-side of power converter 220, a circulation current path may be formed via the DC-side of EMI filter 280 to the fault location when switches 231-236 of power converter 220 are active. This may result in an increased flow of high frequency currents and increased voltage in EMI filter 280 components.

In some examples, and as shown in FIG. 2, EMI filter 280 may include at least one current sensor 275 to measure the current across at least one of Y-capacitors 284, 285. For this example, the current across Y-capacitor 284 will be discussed as being measured, but the current across Y-capacitor 285 voltage may also be measured or the current across both Y-capacitors 284 and 285 may also be measured.

In normal operation or when there is a DC side ground, the current across Y-capacitor 284 will be very small. A first current threshold level may be determined based on the current across Y-capacitor 284 when electrical power system 200 is in normal operation or when there is a DC-side ground. However, when there is an AC-side ground fault 294, as shown in FIG. 2, the current across Y-capacitor 284 will be significantly larger than when electrical power system 200 is in normal operation or when there is a DC-side ground. Thus, when there is an AC-side ground fault 294, the measured current by current sensor 275 may be greater than a determined first current threshold. Accordingly, after measuring the current across Y-capacitor 284 and determining that the value of the current across Y-capacitor 284 is greater than the first current threshold, controller 290 may determine an occurrence of a ground fault on the AC side of power converter 220.

Controller 290 may then control operation of power converter 220 based on the controller determines the occurrence of a ground fault on the AC side of power converter 220. In some examples, controller 290 may control power converter 220 to continue to operate or may control power converter 220 to shut down.

Power converter 220 with a single AC-side ground fault 294 may be able to continue to operate with a single ground fault as long as the internal components of power converter 220 are able to withstand the current resulting from the AC-side ground fault 294. When controller 290 determines the occurrence of a ground fault 294 on the AC side of power converter 220, as discussed above, controller 290 may then compare the measured current across Y-capacitor 284 to a second current threshold. The second current threshold being greater than the first current threshold. The second current threshold corresponding to a current level in which the internal components of power converter 220 may not be able to safely withstand. When controller 290 determines the measured current across Y-capacitor 284 is below the second current threshold, controller 290 continues operation of the power converter 220. When controller 290 determines the measured current across Y-capacitor 284 is above the second current threshold, controller 290 stops operation of the power converter 220.

Figure 3:
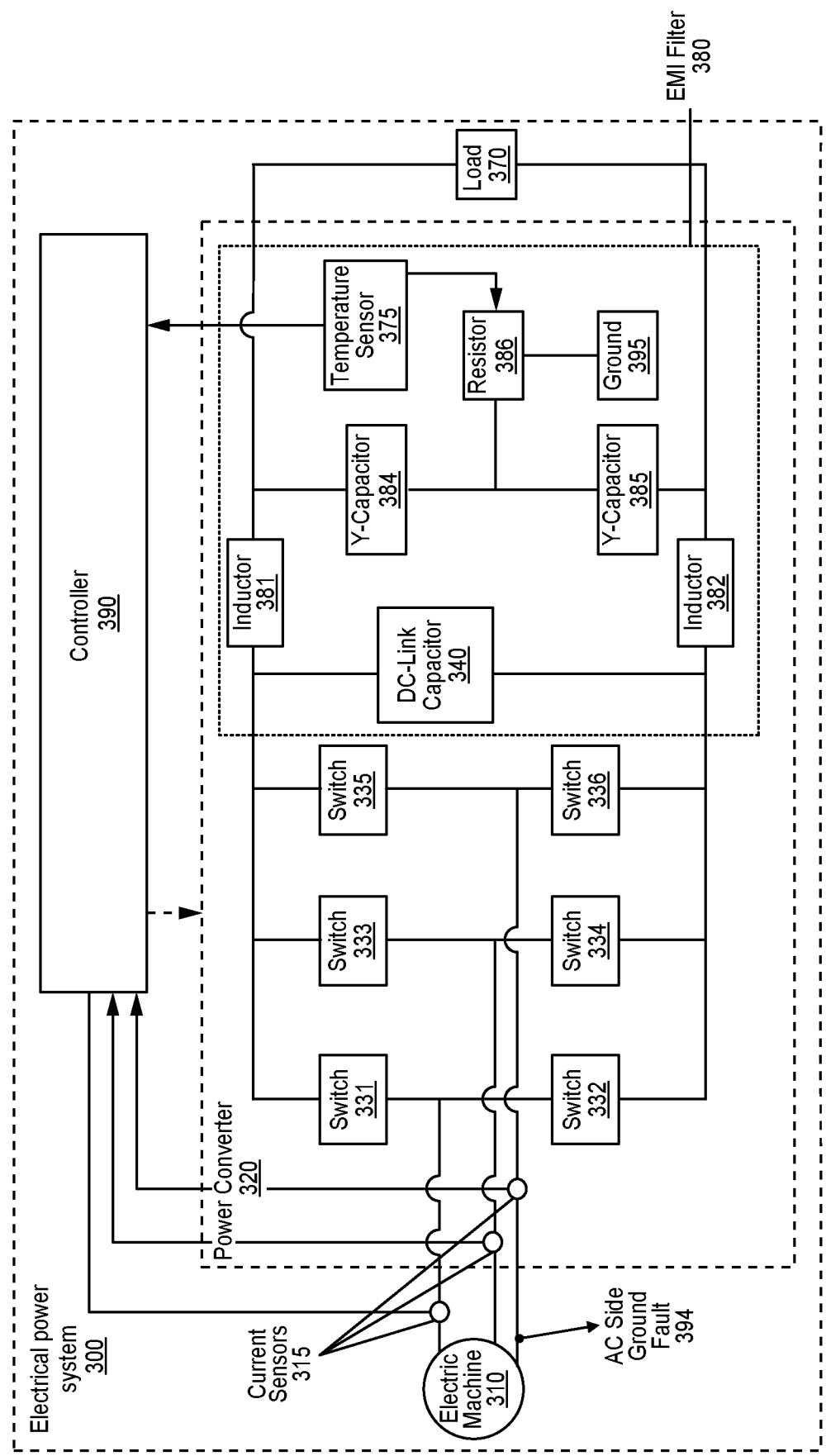

FIG. 3 is a conceptual block diagram illustrating electrical power system 300 including power converter 320 and controller 390 for determining an occurrence of an AC side ground fault 394 in electrical power system 300, in accordance with one or more techniques of this disclosure. Controller 390 may be configured to activate and deactivate switches 331-336 based on electrical signals received by controller 390 from current sensors 315. Current sensors 315 may be inside and/or outside of power converter 320.

Electrical power system 300 may be configured to deliver electrical power generated by electric machine 310 to load 370 via power converter 320. Power converter 320 is depicted as including six switches 331-336, although other numbers and arrangements of switches are possible for power converter 320. Switches 331-336 may include insulated-gate bipolar transistors (IGBTs), metal-oxide-semiconductor field-effect transistors (FETs), junction FETs, and/or any other transistor devices. Switches 331-336 may also be power electronic switches (e.g., either IGBTs with accompanying reverse diode, or FETs). Switches 331-336 may include materials such as GaN and/or SiC and may include antiparallel diodes in some examples.

FIG. 3 shows just one example of electrical power system 300, and many other examples of electrical power systems may use the techniques described herein.

In an example, electrical power system 300 may include a mixed AC/DC system. In some examples, electrical power system 300 may include micro-grid, an AC/AC system, a DC/DC system, an AC bus, a DC bus, and/or any other type of electrical system. Electrical power system 300 may also be part of a power generation system such as a power plant, a power distribution system, and/or a residential or commercial power system, which may include energy storage and electrical loads. Electrical power system 300 may be a part of an aerospace, marine, or automotive system. The techniques of this disclosure may be especially useful in electrical vehicles, such as for the battery disconnect systems in electrical vehicles. Electrical power system 300 may be part of a vehicle such as any manned or unmanned: air vehicle, land vehicle, marine vehicle, space vehicle, and the like, which may include an engine, a generator, an alternator, and/or a power distribution system.

Electric machine 310 may be configured to generate electrical power. As an example, the electric machine may be a motor or generator. Electric machine 310 may include an electric generator that converts mechanical power derived from a shaft, rotor, and/or other mechanical component to electrical power for use by other components or circuits of electrical power system 300. In some examples, the electric generator may also be mounted to a mechanical distribution system and/or a mechanical transmission system (for clarity in the drawings, neither of which is shown). In some examples, electrical power system 300 may include one or more additional power sources, although not shown in FIG. 3. Electric machine 310 may include an AC generator such as an induction generator or a DC generator that produces DC electricity. Electric machine 310 may include a wound field machine, a Halbach array generator with permanent magnets on a rotor that is driven by an engine shaft or a propulsor shaft, or any other type of generator.

Electric machine 310 may, in some examples, generate AC electricity (e.g., multi-phase AC electricity), and electrical power system 300 may include a power converter 320 to generate DC electricity based on the power generated by electric machine 310. Power converter 320 may be a rectifier circuit that converts AC electricity to DC electricity.

As an example, power converter 320 may be an AC/DC converter connected to electric machine 310, the AC/DC converter having a DC side and an AC side. The AC side may be on electric machine 310 side of power converter 320. The DC side may be on load 370 side of power converter 320.

Power converter 320 is connected between electric machine 310 and load 370. Power converter 320 may include two machine-side switches 331 and 332, two load-side switches 335 and 336, and two additional switches 333 and 334 between machine-side switches 331, 332 and load-side switches 335, 336. Power converter 320 may further include an EMI filter 380.

The load 370 is to receive power form the electric machine 310. As an example, load 370 may include a power converter configured to convert the power received from electric machine 310 to another form of electricity for an electrical load (not shown in FIG. 3). The power converter may produce electrical power in a form that is usable by an electrical load. As an example, load 370 may include an engine, a generator, an alternator, and/or a power distribution system Controller 390 may be configured to control the operation of power converter 320 and any of the sensors in electrical power system 300, such as current sensors 315 and/or temperature sensor 375. Additionally or alternatively, controller 390 may be configured to control the operation of electric machine 310 and/or load 370. Controller 390 may be able to activate or deactivate electric machine 310 or otherwise control a mode of operation of electric machine 310 to deliver different levels and/or types of power. Controller 390 may also be configured to control a mode of operation of power converter 320 to deliver power to load 370.

Although not shown in FIG. 3, controller 390 may include processing circuitry, which can include any suitable arrangement of hardware, software, firmware, or any combination thereof, to perform the techniques attributed to controller 390 herein. Examples of processing circuitry include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When processing circuitry includes software or firmware, processing circuitry further includes any hardware for storing and executing the software or firmware, such as one or more processors or processing units. In examples in which electrical power system 300 are mounted on a vehicle, controller 390 may be implemented by a FADEC unit.

In general, a processing unit may include one or more microprocessors, DSPs, ASICs, FPGAs, or any other equivalent integrated or discrete logic circuitry, as well as any combinations of such components. Although not shown in FIG. 3, controller 390 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 390 (e.g., may be external to a package in which controller 390 is housed). Processing circuitry may be configured to determine whether a signal is greater than or less than a threshold level. For example, processing circuitry may include circuitry (e.g., digital or analog) and/or instructions for performing thresholding operations.

Controller 390 may deliver control signals to a control terminal of each of switches 331-336 to activate or deactivate each of switches 331-336. Controller 390 may be configured to control power converter 320 based on signals received from sensors to achieve a voltage target or to implement a startup routine or a shutdown routine.

As shown in FIG. 3, EMI filter 380 may be placed between switches 331-336 and load 370. As an example, as shown in FIG. 3, EMI filter 380 may include DC-link capacitor 340, two Y-capacitors 384, 385, two inductors 381, 382, and resistor 386. Inductors 381, 382, may affect the conduction of electricity along the electrical lines. FIG. 3 shows just one example of EMI filter 380, and many other examples of EMI filters may use the techniques described herein.

In some examples, AC side ground fault 394 may occur in winding of electrical machine 310, connecting cable, or on an AC side of power converter 320. In an example, AC side ground fault 394 may occur on an electrical line between electric machine 310 and at least one of switches 331-336. An AC side ground fault 394 may occur for many potential reasons, including the breakdown of insulation on an electrical line and/or the failure of a switch or a capacitor.

As an example, when a ground fault occurs on AC side of power converter 320, a circulation current path may be formed via the DC-side of EMI filter 380 to the fault location when switches 331-336 of power converter 320 are active. This may result in an increased flow of high frequency currents and increased voltage in EMI filter 380 components.

As an example, and as shown in FIG. 3, EMI filter 380 may include at least one temperature sensor 375 to measure the temperature of resistor 386. In some examples, temperature sensor 375 may be a thermocouple, a resistance temperature detector (RTD) or any combination thereof. In normal operation or when there is a DC-side ground fault, the current through resistor 386 is small. The expected temperature of resistor 386 during normal operation or when there is a DC-side ground fault may correspond to the first temperature threshold.

However, when there is an AC side ground fault 394, the current through resistor 386 increases, which increases the temperature of resistor 386. Thus, when there is an AC side ground fault 394, the measured temperature by temperature sensor 375 may be greater than a determined first temperature threshold. Accordingly, after measuring the temperature at resistor 386 and determining that the value of the temperature at resistor 386 is greater than the first temperature threshold, controller 390 may determine an occurrence of a ground fault 394 on the AC side of power converter 320.

Controller 390 may then control operation of power converter 320 based on controller 390 determining the occurrence of a ground fault on the AC side of the power converter 320. In some examples, controller 390 may control power converter 320 to continue to operate or may control power converter 320 to shut down.

In some examples, when there is an AC side ground fault 394, current may be increased in power converter 320. Power converter 320 with a single AC-side ground fault may be able to continue to operate with a single ground fault as long as the internal components of power converter 320 are able to withstand the increased temperature resulting from the AC-side ground fault. When controller 390 determines the occurrence of a ground fault 394 on the AC-side of the power converter 320, as discussed above, controller 390 may then compare the temperature at resistor 386 to a second temperature threshold. The second temperature threshold is greater than the first temperature threshold. The second temperature threshold corresponding to a temperature level in which the internal components of power converter 320 may not be able to safely withstand. When controller 390 determines the temperature at resistor 386 is below the second temperature threshold, controller 390 continues operation of power converter 320. When controller 390 determines the measured temperature at resistor 386 is above the second temperature threshold, controller 390 stops operation of power converter 320.

Figure 4:
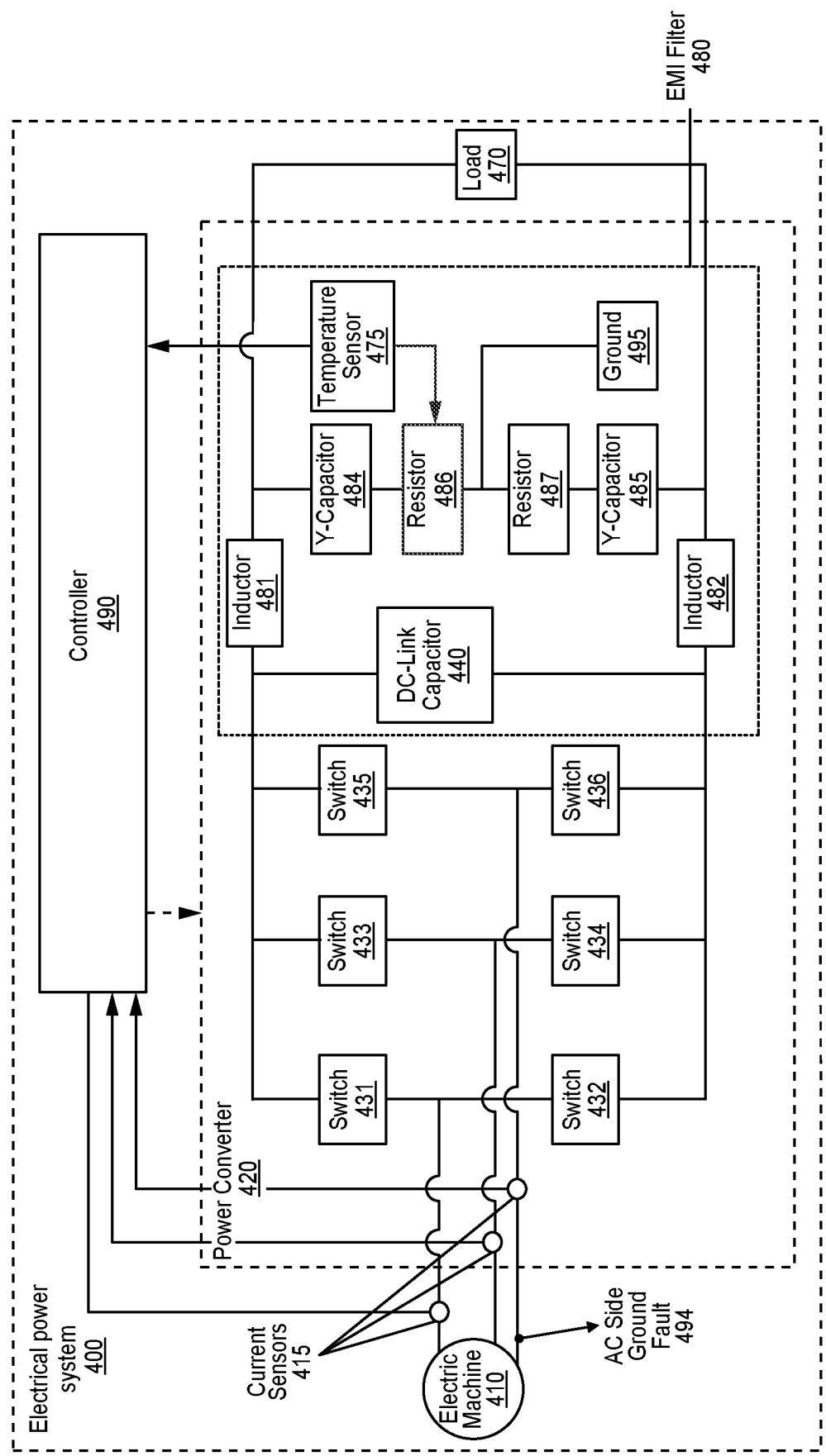

FIG. 4 is a conceptual block diagram illustrating electrical power system 400 including power converter 420 and controller 490 for determining an occurrence of an AC side ground fault 494 in electrical power system 400, in accordance with one or more techniques of this disclosure. Controller 490 may be configured to activate and deactivate switches 431-436 based on electrical signals received by controller 490 from current sensors 415. Current sensors 415 may be inside and/or outside of power converter 420.

Electrical power system 400 may be configured to deliver electrical power generated by electric machine 410 to load 470 via power converter 420. Power converter 420 is depicted as including six switches 431-436, although other numbers and arrangements of switches are possible for power converter 420. Switches 431-436 may include insulated-gate bipolar transistors (IGBTs), metal-oxide-semiconductor field-effect transistors (FETs), junction FETs, and/or any other transistor devices. Switches 431-436 may also be power electronic switches (e.g., either IGBTs with accompanying reverse diode, or FETs). Switches 431-436 may include materials such as GaN and/or SiC and may include antiparallel diodes in some examples.

FIG. 4 shows just one example of electrical power system 400, and many other examples of electrical power systems may use the techniques described herein.

In an example, electrical power system 400 may include a mixed AC/DC system. In some examples, electrical power system 400 may include micro-grid, an AC/AC system, a DC/DC system, an AC bus, a DC bus, and/or any other type of electrical system. Electrical power system 400 may also be part of a power generation system such as a power plant, a power distribution system, and/or a residential or commercial power system, which may include energy storage and electrical loads. Electrical power system 400 may be a part of an aerospace, marine, or automotive system. The techniques of this disclosure may be especially useful in electrical vehicles, such as for the battery disconnect systems in electrical vehicles. Electrical power system 400 may be part of a vehicle such as any manned or unmanned: air vehicle, land vehicle, marine vehicle, space vehicle, and the like, which may include an engine, a generator, an alternator, and/or a power distribution system.

Electric machine 410 may be configured to generate electrical power. As an example, the electric machine may be a motor or generator. Electric machine 410 may include an electric generator that converts mechanical power derived from a shaft, rotor, and/or other mechanical component to electrical power for use by other components or circuits of electrical power system 400. In some examples, the electric generator may also be mounted to a mechanical distribution system and/or a mechanical transmission system (for clarity in the drawings, neither of which is shown). In some examples, electrical power system 400 may include one or more additional power sources, although not shown in FIG. 4. Electric machine 410 may include an AC generator such as an induction generator or a DC generator that produces DC electricity. Electric machine 410 may include a wound field machine, a Halbach array generator with permanent magnets on a rotor that is driven by an engine shaft or a propulsor shaft, or any other type of generator.

Electric machine 410 may, in some examples, generate AC electricity (e.g., multi-phase AC electricity), and electrical power system 400 may include power converter 420 to generate DC electricity based on the power generated by electric machine 410. Power converter 420 may be a rectifier circuit that converts AC electricity to DC electricity.

As an example, power converter 420 may be an AC/DC converter connected to electric machine 410, the AC/DC converter having a DC side and an AC side. The AC side may be on electric machine 410 side of power converter 420. The DC side may be on load 470 side of power converter 420.

Power converter 420 is connected between electric machine 410 and load 470. Power converter 420 may include two machine-side switches 431 and 432, two load-side switches 435 and 436, and two additional switches 433 and 434 between machine-side switches 431, 432 and the load-side switches 435, 436. Power converter 420 may further include an electromagnetic interference (EMI) filter 480.

Load 470 is to receive power form electric machine 410 and may. As an example, load 470 may include a power converter configured to convert the power received from electric machine 410 to another form of electricity for an electrical load (not shown in FIG. 4). The power converter may produce electrical power in a form that is usable by an electrical load. As an example, load 470 may include an engine, a generator, an alternator, and/or a power distribution system Controller 490 may be configured to control the operation of the power converter 420 and any of the sensors in electrical power system 400, such as current sensors 415 and/or temperature sensor 475. Additionally or alternatively, controller 490 may be configured to control the operation of electric machine 410 and/or load 470. Controller 490 may be able to activate or deactivate electric machine 410 or otherwise control a mode of operation of electric machine 410 to deliver different levels and/or types of power. Controller 490 may also be configured to control a mode of operation of power converter 420 to deliver power to load 470.

Although not shown in FIG. 4, controller 490 may include processing circuitry, which can include any suitable arrangement of hardware, software, firmware, or any combination thereof, to perform the techniques attributed to controller 490 herein. Examples of processing circuitry include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When processing circuitry includes software or firmware, processing circuitry further includes any hardware for storing and executing the software or firmware, such as one or more processors or processing units. In examples in which electrical power system 400 are mounted on a vehicle, controller 490 may be implemented by a FADEC unit.

In general, a processing unit may include one or more microprocessors, DSPs, ASICs, FPGAs, or any other equivalent integrated or discrete logic circuitry, as well as any combinations of such components. Although not shown in FIG. 4, controller 490 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 290 (e.g., may be external to a package in which controller 490 is housed). Processing circuitry may be configured to determine whether a signal is greater than or less than a threshold level. For example, processing circuitry may include circuitry (e.g., digital or analog) and/or instructions for performing thresholding operations.

Controller 490 may deliver control signals to a control terminal of each of switches 431-436 to activate or deactivate each of switches 431-436. Controller 490 may be configured to control power converter 420 based on signals received from sensors to achieve a voltage target or to implement a startup routine or a shutdown routine.

As shown in FIG. 4, EMI filter 480 may be placed between switches 431-436 and load 470. As an example, as shown in FIG. 4, EMI filter 480 may include DC-link capacitor 440, two Y-capacitors 484, 485, two inductors 481, 482, and two resistors 486, 487. Inductors 481, 482, may affect the conduction of electricity along the electrical lines. FIG. 4 shows just one example of EMI filter 480, and many other examples of EMI filters may use the techniques described herein.

In some examples, AC side ground fault 494 may occur in winding of electrical machine 410, connecting cable, or on an AC side of power converter 420. In an example, AC side ground fault 494 may occur on an electrical line between electric machine 410 and at least one of switches 431-136. An AC side ground fault 494 may occur for many potential reasons, including the breakdown of insulation on an electrical line and/or the failure of a switch or a capacitor.

As an example, when a ground fault 494 occurs on an AC side of power converter 420, a circulation current path may be formed via the DC-side of EMI filter 480 to the fault location when switches 431-436 of power converter 420 are active. This may result in an increased flow of high frequency currents and increased voltage in EMI filter 480 components.

As an example, and as shown in FIG. 4, EMI filter 480 may include at least one In some examples, temperature sensor 475 may be a thermocouple, a resistance temperature detector (RTD) or any combination thereof. In the example shown in FIG. 4 and discussed below, temperature sensor 475 measures the temperature of resistor 486. However, temperature sensor 475 may also measure the temperature of resistor 487 or any combination thereof. In normal operation or when there is a DC-side ground fault, the current through resistor 486 is small. The expected temperature of resistor 486 during normal operation or when there is a DC-side ground fault may correspond to a first temperature threshold.

However, when there is an AC side ground fault 494, the current through resistor 486 increases, which increases the temperature of resistor 486. Thus, when there is an AC side ground fault 494, the measured temperature by temperature sensor 475 may be greater than the first temperature threshold. Accordingly, after measuring the temperature at resistor 486 and determining that the value of the temperature at resistor 486 is greater than the first temperature threshold, controller 490 may determine an occurrence of a ground fault 494 on the AC side of power converter 420.

Controller 490 may then control operation of power converter 420 based on controller 490 determining the occurrence of a ground fault on the AC side of the power converter 420. In some examples, controller 490 may control power converter 420 to continue to operate or may control power converter 420 to shut down.

In some examples, when there is an AC side ground fault 494, current may be increased in power converter 420. Power converter 420 with a single AC side ground fault may be able to continue to operate with a single ground fault as long as the internal components of power converter 420 are able to withstand the increased temperature resulting from the AC side ground fault. When controller 490 determines the occurrence of a ground fault 494 on the AC-side of power converter 420, as discussed above, controller 490 may then compare the temperature at resistor 486 to a second temperature threshold. The second temperature threshold is greater than the first temperature threshold. The second temperature threshold corresponding to a temperature level in which the internal components of power converter 420 may not be able to safely withstand. When the controller 490 determines the temperature at resistor 486 is below the second temperature threshold, controller 490 continues operation of power converter 420. When controller 490 determines the measured temperature at resistor 486 is above the second temperature threshold, controller 490 stops operation of power converter 420.

Figure 5:
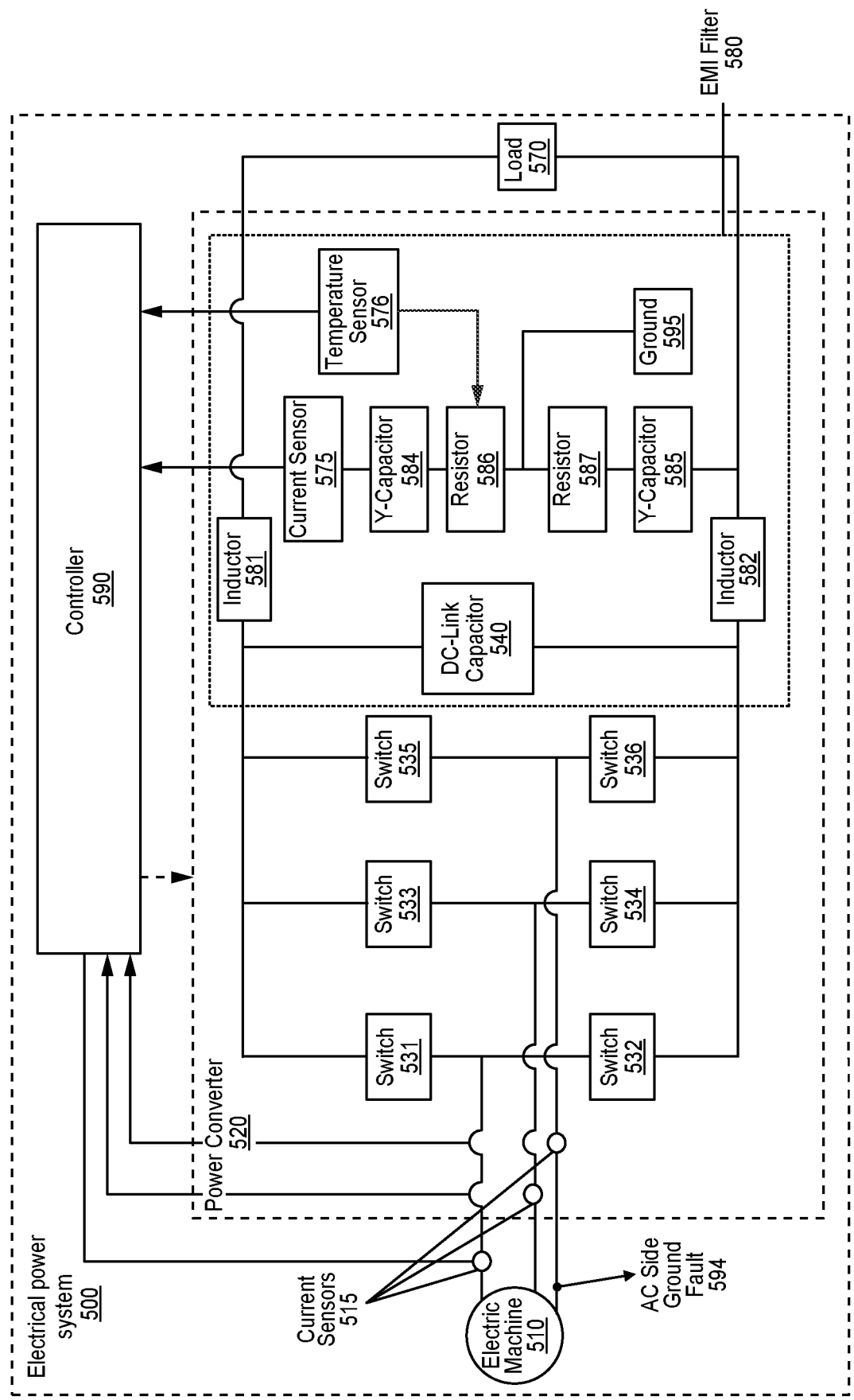

FIG. 5 is a conceptual block diagram similar to the block diagrams shown in FIGS. 2 and 4. The discussion of the features in FIGS. 2 and 4 above applies to the similar features that are shown in FIG. 5.

As an example, in FIG. 5, when a ground fault 594 occurs on AC-side of power converter 520, a circulation current path may be formed via the DC-side of EMI filter 580 to the fault location when the switches 531-536 of power converter 520 are active. This may result in an increased flow of high frequency currents and increased voltage in EMI filter 580 components.

As an example, and as shown in FIG. 5, the EMI filter 580 may include at least one temperature sensor 576 to measure the temperature of at least one of resistors 586 and 587. In some examples, temperature sensor 576 may be a thermocouple, a resistance temperature detector (RTD) or any combination thereof. In the example shown in FIG. 5 and discussed below, the temperature measures the temperature of resistor 586. However, temperature sensor 575 may also measure the temperature of resistor 587 or any combination thereof.

EMI filter 580 may also include at least one current sensor 575 to measure the current across at least one of Y-capacitors 584, 585. For this example, the current across Y-capacitor 584 will be discussed as being measured, but the current across Y-capacitor 585 voltage may also be measured or the current across both Y-capacitors 584 and 585 may also be measured.

In normal operation or when there is a DC side ground fault, the current through resistor 586 is small. The expected temperature of the resistor 586 during normal operation or when there is a DC side ground fault may correspond to the first temperature threshold. In normal operation or when there is a DC side ground, the current across Y-capacitor 584 may be very small. A first current threshold level may be determined based on the expected current across Y-capacitor 584 when electrical power system 500 is in normal operation or when there is a DC side ground.

However, when there is an AC side ground fault 594, the current through resistor 586 increases, which increases the temperature of resistor 586. Thus, when there is an AC-side ground fault 594, the measured temperature by temperature sensor 576 may be greater than a determined first temperature threshold. In addition, when there is an AC-side ground fault 594, the current across Y-capacitor 584 may be significantly larger than when electrical power system 500 is in normal operation or when there is a DC side ground. Thus, when there is an AC-side ground fault 594, the measured current by current sensor 575 may be greater than a determined first current threshold.

Accordingly, after measuring the temperature at resistor 586 and measuring the current across Y-capacitor 584 and determining that the value of the temperature at resistor 586 is greater than the first temperature threshold and the value of the current across Y-capacitor 584 is greater than the first current threshold, controller 590 may determine an occurrence of a ground fault on the AC-side of power converter 520.

Controller 590 may then control operation of power converter 520 based on the controller determining the occurrence of a ground fault on the AC side of power converter 520. In some examples, controller 590 may control power converter 520 to continue to operate or may control power converter 520 to shut down.

Power converter 520 with a single AC-side ground fault may be able to continue to operate with a single ground fault as long as the internal components of power converter 520 are able to safely withstand the increased current and temperature resulting from the AC-side ground fault.

In some examples, when there is an AC side ground fault 594, current may be increased in power converter 520. When controller 590 determines the occurrence of a ground fault 594 on the AC-side of power converter 520, as discussed above, controller 590 may then compare the temperature at resistor 586 to a second temperature threshold and compare the measured current across Y-capacitor 584 to a second current threshold. The second temperature threshold being greater than the first temperature threshold and the second current threshold being greater than the first current threshold. The second temperature threshold corresponding to a temperature level in which the internal components of the power converter 520 may not be able to safely withstand. The second current threshold corresponding to a current level in which the internal components of the power converter 520 may not be able to safely withstand.

When controller 590 determines the temperature at resistor 586 is below the second temperature threshold and determines the measured current across Y-capacitor 584 is below the second current threshold, controller 590 continues operation of power converter 520. When controller 590 determines the measured temperature at resistor 586 is above the second temperature threshold and determines the measured current across Y-capacitor 584 is above the second current threshold, controller 590 stops operation of the power converter 520.

Figure 6:
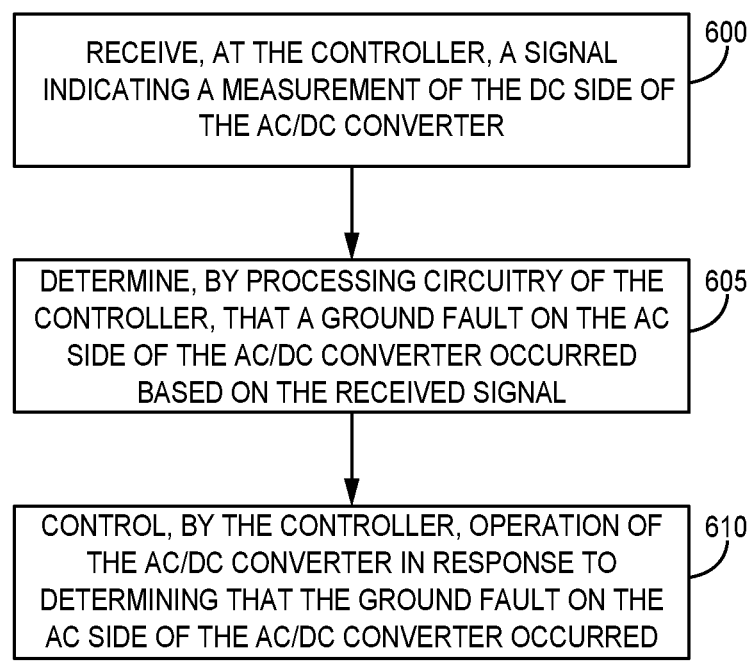
FIGS. 6-9 are flowcharts illustrating example processes for determining an AC-side ground fault and control operation of an AC/DC converter, in accordance with one or more techniques of this disclosure.

FIG. 6 is a flow diagram illustrating an example operation for detecting a fault in power converter 120 connected to electric machine 110 and controller 190, power converter 120 having a DC side, an AC side, and Y-capacitor 184 on the DC side, in accordance with one or more techniques of this disclosure. As an example, as shown in FIG. 6, power converter 120 may be an AC/DC converter. As seen in the example of FIG. 6, initially controller 190 may receive a signal indicating a measurement of the DC side of power converter 120 (600). Next, controller 190 may determine, by processing circuitry of controller 190, that ground fault 194 on the AC side of AC/DC converter 120 occurred based on the received signal (605). Next, controller 190 may control operation of power converter 120 in response to determining that the ground fault on the AC side of power converter 120 occurred (610).

In some examples, controller 190 may control power converter 120 to continue to operate or may control power converter 120 to shut down.

Figure 7:
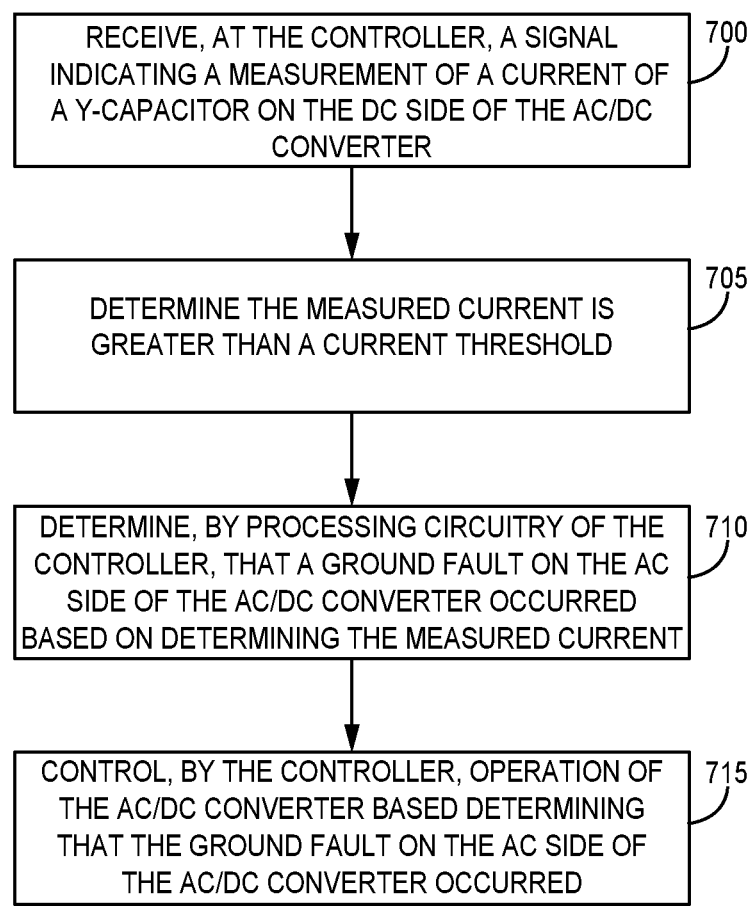

FIG. 7 is a flow diagram illustrating an example operation for detecting a fault in power converter 220 connected to electric machine 210 and controller 290, AC/DC power 220 having a DC side, an AC side, and Y-capacitor 284 on the DC side, in accordance with one or more techniques of this disclosure. As an example, as shown in FIG. 7, power converter 220 may be an AC/DC converter. As seen in the example of FIG. 7, initially controller 290 may receive a signal indicating a measurement of a current of Y-capacitor 284 on the DC side of power converter 220 (700). Next, controller 290 may determine, by processing circuitry of controller 290, that the measured current is greater than a first current threshold (705). Next, controller 290 may determine a ground fault 294 on the AC side of power converter 220 occurred based on determining the measured current is greater than the first current threshold (710). Next, controller 290 may control operation of AC/DC power 220 in response to determining that the ground fault on the AC side of AC/DC power 220 occurred (715). In some examples, controller 290 may control power converter 220 to continue to operate or may control power converter 220 to shut down.

Figure 8:
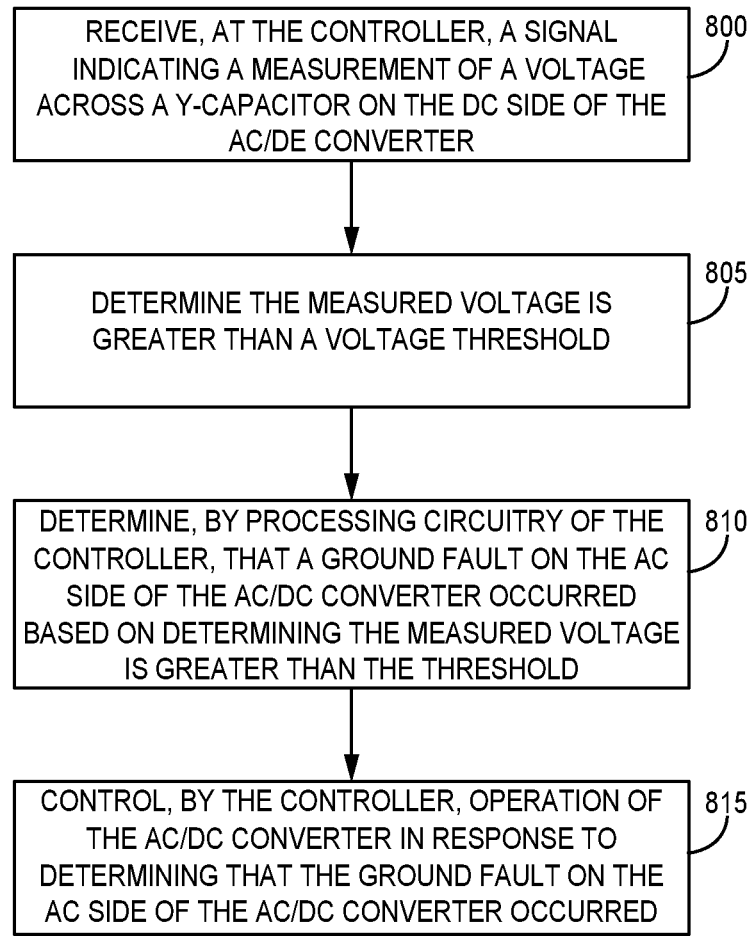

FIG. 8 is a flow diagram illustrating an example operation for detecting a fault in power converter 120 connected to electric machine 110 and controller 190, power converter 120 having a DC side, an AC side, and Y-capacitor 184 on the DC side, in accordance with one or more techniques of this disclosure. As an example, as shown in FIG. 8, power converter 120 may be an AC/DC converter. As seen in the example of FIG. 8, initially controller 190 may receive a signal indicating a measurement of a voltage across Y-capacitor 184 on the DC side of power converter (800). Next, controller 190 may determine, by processing circuitry of controller 190, that the measured voltage is greater than a first voltage threshold (805). Next, controller 190 may determine that a ground fault 194 on the AC side of power converter 120 occurred based on determining the measured voltage is greater than the first voltage threshold (810). Next, the controller 190 may control operation of AC/DC converter 120 in response to determining that the ground fault 194 on the AC side of AC/DC converter 120 occurred (815).

In some examples, controller 190 may control power converter 120 to continue to operate or may control power converter 120 to shut down.

Figure 9:
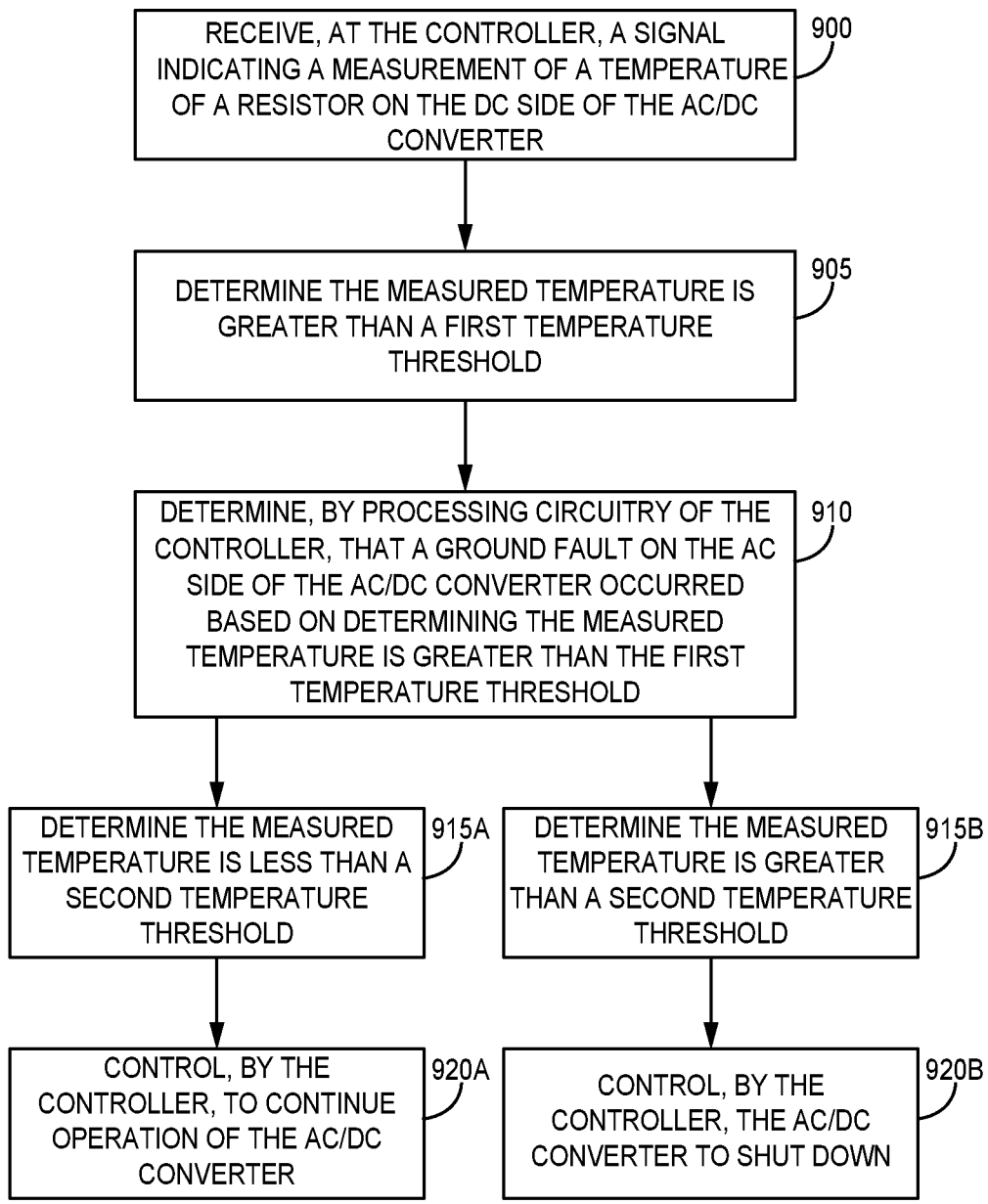

FIG. 9 is a flow diagram illustrating an example operation for detecting a fault in power converter 320 connected to an electric machine 310 and a controller 390, power converter 320 having a DC side, an AC side, and Y-capacitor 384 and resistor 386 on the DC side, in accordance with one or more techniques of this disclosure. As an example, as shown in FIG. 9, power converter 320 may be an AC/DC converter. As seen in the example of FIG. 9, initially controller 390 may receive a signal indicating a measurement of a temperature of resistor 386 on the DC side of the AC/DC converter (900). Next, controller 390 may determine, by processing circuitry of controller 390, that the measured temperature is greater than a first temperature threshold (905). Next, controller 390 may determine that a ground fault 394 on the AC side of power converter 320 occurred based on determining the measured temperature is greater than the temperature threshold (910). Next, controller 390 may either determine the measured temperature is less than or equal to a second temperature threshold (915A) or determine the measured temperature is greater than the second temperature threshold (915B). When controller 390 determines the measured temperature is less than or equal to a second temperature threshold, controller 390 may control AD/DC converter 320 to continue operation (920A). When controller 390 determines the measured temperature is greater than the second temperature threshold, controller 390 may control power converter 320 to shut down (920B).

The following examples may illustrate one or more aspects of the disclosure:

Example 1: A system includes an electric machine; an alternating current (AC)/direct current (DC) converter connected to the electric machine, the AC/DC converter having a DC side and an AC side; a Y-capacitor on the DC side of the AC/DC converter; and a controller configured to: determine, based on a measurement of the DC side of the AC/DC converter, an occurrence of a ground fault on the AC side of the AC/DC converter; and control, based on the occurrence of the ground fault, operation of the AC/DC converter.

Example 2: The system of example 1, wherein the measurement is of the Y-capacitor.

Example 3: The system of any of examples 1 and 2, wherein the measurement indicates a voltage across the Y-capacitor, and the controller is further configured to: determine that the ground fault on the AC side of the AC/DC converter occurred in response to determining that the voltage across the Y-capacitor is above a voltage threshold level.

Example 4: The system of any of examples 1 through 3, wherein the measurement indicates a current in the Y-capacitor, and the controller is further configured to: determine that the ground fault on the AC side of the AC/DC converter occurred in response to determining that the current in the Y-capacitor is above a current threshold level.

Example 5: The system of any of examples 1 through 4, further comprising a resistor on the DC side of the AC/DC converter, wherein the measurement indicates a temperature of the resistor.

Example 6: The system of example 5, wherein the controller is further configured to: determine that the ground fault on the AC side of the AC/DC converter occurred in response to determining that the temperature is greater than a first temperature threshold level.

Example 7: The system of any of examples 5 and 6, wherein the controller is further configured to: continue operation of the AC/DC converter in response to determining the ground fault occurred and determining that the temperature of the resistor is less than a second temperature threshold, the second temperature threshold level being greater than the first temperature threshold level.

Example 8: The system of any of examples 5 and 6, wherein the controller is further configured to: shut down the AC/DC converter in response to determining the ground fault occurred and determining the temperature of the resistor is greater than a second temperature threshold level, the second temperature threshold level being greater than the first temperature threshold level.

Example 9: A method for detecting a fault in an alternating current (AC)/direct current (DC) converter connected to an electric machine and a controller, the AC/DC converter having a DC side, an AC side, and a Y-capacitor on the DC side includes receiving, at the controller, a signal indicating a measurement of the DC side of the AC/DC converter; determining, by processing circuitry of the controller, that a ground fault on the AC side of the AC/DC converter occurred based on the received signal; and controlling, by the controller, operation of the AC/DC converter in response to determining that the ground fault on the AC side of the AC/DC converter occurred.

Example 10: The method of example 9, wherein the measurement is of the Y-capacitor.

Example 11: The method of any of examples 9 and 10, wherein the measurement indicates a voltage across the Y-capacitor, and the method further comprises: determining that the ground fault on the AC side of the AC/DC converter occurred in response to determining that the voltage across the Y-capacitor is above a voltage threshold level.

Example 12: The method of any of examples 9 through 11, wherein the measurement indicates a current in the Y-capacitor, and the method further comprises: determining that the ground fault on the AC side of the AC/DC converter occurred in response to determining that the current in the Y-capacitor is above a current threshold level.

Example 13: The method of any of examples 9 through 12, wherein the measurement indicates a temperature of a resistor on the DC side of the AC/DC converter.

Example 14: The method of example 13, further includes determining that the ground fault on the AC side of the AC/DC converter occurred in response to determining that the temperature is greater than a first temperature threshold level.

Example 15: The method of any of examples 13 and 14, further includes continuing operation of the AC/DC converter in response to determining the ground fault occurred and determining that the temperature of the resistor is less than a second temperature threshold level, the second temperature threshold level being greater than the first temperature threshold level.

Example 16: The method of any of examples 13 and 14, further includes shutting down the AC/DC converter in response to determining the ground fault occurred and determining that the temperature of the resistor is greater than a second temperature threshold level, the second temperature threshold level being greater than the first temperature threshold level.

Example 17: A device includes receive a signal indicating a measurement of a direct current (DC) side of an alternating current (AC)/DC converter; determine that a ground fault on an AC side of the AC/DC converter occurred based on the received signal; and control operation of the AC/DC converter in response to determining that the ground fault on the AC side of the AC/DC converter occurred.

Example 18: The device of example 17, wherein the measurement indicates at least one of a voltage across a Y-capacitor on the DC side and a current in the Y-capacitor, and the instructions are configured to be executable by the processing circuitry for further causing the processing circuitry to: determine that the ground fault on the AC side of the AC/DC converter occurred in response to determining that the voltage across a Y-capacitor is greater than a voltage threshold level or determining that the current in the Y-capacitor is greater than a current threshold level.

Example 19: The device of any of examples 17 and 18, wherein the measurement indicates a temperature of a resistor on the DC side of the AC/DC converter, and the instructions are configured to be executable by the processing circuitry for further causing the processing circuitry to: determine that the ground fault on the AC side of the AC/DC converter occurred in response to determining that the temperature of the resistor is greater than a first temperature threshold level.

Example 20: The device of any of examples 17 through 19, wherein the instructions are configured to be executable by the processing circuitry for further causing the processing circuitry to: continue operation of the AC/DC converter in response to determining the ground fault occurred and determining that the temperature of the resistor is less than a second temperature threshold level, the second temperature threshold level being greater than the first temperature threshold level.

Various examples have been described. These and other examples are within the scope of the following claims.

What is claimed is:

1. A system comprising:
an electric machine;
an alternating current (AC)/direct current (DC) converter connected to the electric machine, the AC/DC converter having a DC side and an AC side;
a Y-capacitor on the DC side of the AC/DC converter; and
a controller configured to:
determine, based on a measurement of the DC side of the AC/DC converter, an occurrence of a ground fault on the AC side of the AC/DC converter; and
control, based on the occurrence of the ground fault, operation of the AC/DC converter.

2. The system of claim 1, wherein the measurement is of the Y-capacitor.

3. The system of claim 2, wherein the measurement indicates a voltage across the Y-capacitor, and the controller is further configured to:
determine that the ground fault on the AC side of the AC/DC converter occurred in response to determining that the voltage across the Y-capacitor is above a voltage threshold level.

4. The system of claim 2, wherein the measurement indicates a current in the Y-capacitor, and the controller is further configured to:
determine that the ground fault on the AC side of the AC/DC converter occurred in response to determining that the current in the Y-capacitor is above a current threshold level.

5. The system of claim 1, further comprising a resistor on the DC side of the AC/DC converter, wherein the measurement indicates a temperature of the resistor.

6. The system of claim 5, wherein the controller is further configured to:
  determine that the ground fault on the AC side of the AC/DC converter occurred in response to determining that the temperature is greater than a first temperature threshold level.

7. The system of claim 6, wherein the controller is further configured to:
  continue operation of the AC/DC converter in response to determining the ground fault occurred and determining that the temperature of the resistor is less than a second temperature threshold, the second temperature threshold level being greater than the first temperature threshold level.

8. The system of claim 6, wherein the controller is further configured to:
  shut down the AC/DC converter in response to determining the ground fault occurred and determining the temperature of the resistor is greater than a second temperature threshold level, the second temperature threshold level being greater than the first temperature threshold level.

9. A method for detecting a fault in an alternating current (AC)/direct current (DC) converter connected to an electric machine and a controller, the AC/DC converter having a DC side, an AC side, and a Y-capacitor on the DC side, the method comprising:
  receiving, at the controller, a signal indicating a measurement of the DC side of the AC/DC converter;
  determining, by processing circuitry of the controller, that a ground fault on the AC side of the AC/DC converter occurred based on the received signal; and
  controlling, by the controller, operation of the AC/DC converter in response to determining that the ground fault on the AC side of the AC/DC converter occurred.

10. The method of claim 9, wherein the measurement is of the Y-capacitor.

11. The method of claim 10, wherein the measurement indicates a voltage across the Y-capacitor, and the method further comprises:
  determining that the ground fault on the AC side of the AC/DC converter occurred in response to determining that the voltage across the Y-capacitor is above a voltage threshold level.

12. The method of claim 10, wherein the measurement indicates a current in the Y-capacitor, and the method further comprises:
  determining that the ground fault on the AC side of the AC/DC converter occurred in response to determining that the current in the Y-capacitor is above a current threshold level.

13. The method of claim 9, wherein the measurement indicates a temperature of a resistor on the DC side of the AC/DC converter.

14. The method of claim 13, further comprising:
  determining that the ground fault on the AC side of the AC/DC converter occurred in response to determining that the temperature is greater than a first temperature threshold level.

15. The method of claim 14, further comprising:
  continuing operation of the AC/DC converter in response to determining the ground fault occurred and determining that the temperature of the resistor is less than a second temperature threshold level, the second temperature threshold level being greater than the first temperature threshold level.

16. The method of claim 14, further comprising:
  shutting down the AC/DC converter in response to determining the ground fault occurred and determining that the temperature of the resistor is greater than a second temperature threshold level, the second temperature threshold level being greater than the first temperature threshold level.

17. A device comprising a computer-readable storage medium having executable instructions stored thereon, configured to be executable by processing circuitry of the device for causing the processing circuitry to:
  receive a signal indicating a measurement of a direct current (DC) side of an alternating current (AC)/DC converter;
  determine that a ground fault on an AC side of the AC/DC converter occurred based on the received signal; and
  control operation of the AC/DC converter in response to determining that the ground fault on the AC side of the AC/DC converter occurred.

18. The device of claim 17, wherein the measurement indicates at least one of a voltage across a Y-capacitor on the DC side and a current in the Y-capacitor, and the instructions are configured to be executable by the processing circuitry for further causing the processing circuitry to:
  determine that the ground fault on the AC side of the AC/DC converter occurred in response to determining that the voltage across the Y-capacitor is greater than a voltage threshold level or determining that the current in the Y-capacitor is greater than a current threshold level.

19. The device of claim 17, wherein the measurement indicates a temperature of a resistor on the DC side of the AC/DC converter, and the instructions are configured to be executable by the processing circuitry for further causing the processing circuitry to:
  determine that the ground fault on the AC side of the AC/DC converter occurred in response to determining that the temperature of the resistor is greater than a first temperature threshold level.

20. The device of claim 19, wherein the instructions are configured to be executable by the processing circuitry for further causing the processing circuitry to:
  continue operation of the AC/DC converter in response to determining the ground fault occurred and determining that the temperature of the resistor is less than a second temperature threshold level, the second temperature threshold level being greater than the first temperature threshold level.

* * * * *